(12) United States Patent
Cetintas et al.

(10) Patent No.: US 11,587,143 B2
(45) Date of Patent: Feb. 21, 2023

(54) NEURAL CONTEXTUAL BANDIT BASED COMPUTATIONAL RECOMMENDATION METHOD AND APPARATUS

(71) Applicant: YAHOO ASSETS LLC, Dulles, VA (US)

(72) Inventors: Suleyman Cetintas, Cupertino, CA (US); Xian Wu, South Bend, IN (US); Jian Yang, Palo Alto, CA (US)

(73) Assignee: YAHOO ASSETS LLC, Dulles, VA (US)

(*) Notice: Subject to any disclaimer, the term of this patent is extended or adjusted under 35 U.S.C. 154(b) by 0 days.

(21) Appl. No.: 17/466,879

(22) Filed: Sep. 3, 2021

(65) Prior Publication Data
US 2021/0398193 A1 Dec. 23, 2021

Related U.S. Application Data

(63) Continuation of application No. 16/839,436, filed on Apr. 3, 2020, now Pat. No. 11,113,745.

(51) Int. Cl.
| | |
|---|---|
| *G06Q 30/00* | (2012.01) |
| *G06Q 30/0601* | (2023.01) |
| *G06F 16/9535* | (2019.01) |
| *G06F 16/901* | (2019.01) |
| *G06F 16/22* | (2019.01) |

(Continued)

(52) U.S. Cl.
CPC ..... *G06Q 30/0631* (2013.01); *G06F 16/2237* (2019.01); *G06F 16/2264* (2019.01); *G06F 16/9024* (2019.01); *G06F 16/9535* (2019.01); *G06N 20/00* (2019.01); *G06Q 10/087* (2013.01); *G06Q 30/0204* (2013.01); *G06Q 30/0282* (2013.01); *G06Q 30/0625* (2013.01); *G06Q 50/01* (2013.01)

(58) Field of Classification Search
None
See application file for complete search history.

(56) References Cited

U.S. PATENT DOCUMENTS

| | | |
|---|---|---|
| 2016/0147767 A1 | 5/2016 | Manning et al. |
| 2019/0005547 A1 | 1/2019 | Tan et al. |

(Continued)

OTHER PUBLICATIONS

Cesa-Bianchi et al., "A Gang of Bandits," NIPS, pp. 737-745 (2013).

(Continued)

*Primary Examiner* — Mila Airapetian
(74) *Attorney, Agent, or Firm* — James J. DeCarlo; Greenberg Traurig LLP

(57) ABSTRACT

Disclosed are systems and methods utilizing neural contextual bandit for improving interactions with and between computers in content generating, searching, hosting and/or providing systems supported by or configured with personal computing devices, servers and/or platforms. The systems interact to make item recommendations using latent relations and latent representations, which can improve the quality of data used in processing interactions between or among processors in such systems. The disclosed systems and methods use neural network modeling in automatic selection of a number of items for recommendation to a user and using feedback in connection with the recommendation for further training of the model(s).

20 Claims, 11 Drawing Sheets

(51) Int. Cl.
    G06N 20/00      (2019.01)
    G06Q 10/087     (2023.01)
    G06Q 30/0204    (2023.01)
    G06Q 50/00      (2012.01)
    G06Q 30/0282    (2023.01)

(56) References Cited

U.S. PATENT DOCUMENTS

2019/0080383 A1    3/2019   Garcia et al.
2020/0410547 A1*  12/2020   Arora .............. G06Q 30/0271

OTHER PUBLICATIONS

Chen et al. "Attentive Collaborative Filtering: Multimedia Recommendation with Item- and Component-Level Attention," SIGIR, ACM, pp. 335-344 (2017).
Cheng et al. "Wide & Deep Learning for Recommender Systems," 4 pages (2016).
Dong et al., "metapath2vec: Scalable Representation Learning for Heterogeneous Networks," KDD, ACM, pp. 135-144 (2017).
Faußer et al., "Neural Network Ensembles in Reinforcement Learning," Neural Processing Letters, vol. 41, No. 1, pp. 55-69 (2015).
Gal, Yarin, "Uncertainty in Deep Learning," University of Cambridge (2016).
Gal, "Dropout as a Bayesian Approximation: Representing Model Uncertainty in Deep Learning," ICML, pp. 1050-1059 (2016).
Gentile et al., "On Context-Dependent Clustering of Bandits," ICML, JMLR org, pp. 1253-1262 (2015).
Gentile et al., "Online Clustering of Bandits," ICML, pp. 757-765 (2014).
Grbovic et al., "Context- and Content-aware Embeddings for Query Rewriting in Sponsored Search,"SIGIR, ACM, pp. 383-392 (2015).
Grisetti et al., "Fast and accurate SLAM with Rao-Blackwellized particle filters," ScienceDirect, Robotics and Autonomous Systems 55, pp. 30-38 (2007).
Grover et al., "node2vec: Scalable Feature Learning for Networks," KDD, ACM, pp. 855-864 (2016).
He et al., "Neural Collaborative Filtering," www.acm pp. 173-182 (2017).
He et al., "Fast Matrix Factorization for Online Recommendation with Implicit Feedback," SIGIR, ACM, pp. 549-558 (2016).
Hofmann et al., "Reusing Historical Interaction Data for Faster Online Learning to Rank for IR," WSDM, ACM, pp. 183-192 (2013).
Hsieh et al., "Collaborative Metric Learning," www.acm, pp. 193-201 (2017).
Karatzoglou et al., "Multiverse Recommendation: N-dimensional Tensor Factorization for Context-aware Collaborative Filtering," Recsys, ACM, pp. 79-86 (2010).
Kingma et al., "Adam: A Method for Stochastic Optimization," arXiv preprint arXiv:1412.6980 (2014).
Korda et al., "Distributed Clustering of Linear Bandits in Peer to Peer Networks," JMLR, vol. 48, International Machine Learning Society, pp. 1301-1309 (2016).
Li et al., "Unbiased Offline Evaluation of Contextual-bandit-based News Article Recommendation Algorithms," WSDM, ACM, pp. 297-306 (2011).
Li et al., "A Contextual-Bandit Approach to Personalized News Article Recommendation," WWW, ACM, pp. 661-670 (2010).
Li et al., "Graph Clustering Bandits for Recommendation," arXiv preprint arXiv:1605.00596 (2016).
Li et al., "Collaborative Filtering Bandits," SIGIR, ACM, pp. 539-548 (2016).
Li et al., "Collaborative Variational Autoencoder for Recommender Systems," KDD, ACM, pp. 305-314 (2017).
Liao et al., "Person Re-identification by Local Maximal Occurrence Representation and Metric Learning," CVPR, pp. 2197-2206 (2015).
Liu et al., "Transferable Contextual Bandit for Cross-Domain Recommendation," AAAI, 8 pages (2018).
Mikolov et al., "Distributed Representations of Words and Phrasesand their Compositionality," NIPS, pp. 3111-3119 (2013).
Nakamura et al., "A UCB-Like Strategy of Collaborative Filtering," ACML, pp. 315-329 (2015).
Peretroukhin et al., "Reducing Drift in Visual Odometry by Inferring Sun Direction Using a Bayesian Convolutional Neural Network," ICRA, IEEE, pp. 2035-2042 (2017).
Riquelme et al., "Deep Bayesian Bandits Showdown," ICLR (2018).
Russo et al., "A Tutorial on Thompson Sampling," Machine Learning, pp. 1-96 (2018).
Liu et al., "Customized Nonlinear Bandits for Online Response Selection in Neural Conversation Models," AAAI, 8 pages (2018).
Tokic, Michel, "Adaptive e-greedy Exploration in Reinforcement Learning Based on Value Differences," AAAI, pp. 203-210 (2010).
Van den Oord et al., "Deep content-based music recommendation," AAAI, pp. 2643-2651 (2013).
Wang et al., "Learning Hidden Features for Contextual Bandits," CIKM, ACM, pp. 1633-1642 (2016).
Wu et al., "Learning Contextual Bandits in a Non-stationary Environment," SIGIR, 10 pages (2018).
Wu et al., "Contextual Bandits in A Collaborative Environment," SIGIR, ACM, pp. 529-538 (2016).
Xia et al., "Listwise Approach to Learning to Rank—Theory and Algorithm," ICML, ACM, pp. 1192-1199 (2008).
Yu et al., "Personalized Entity Recommendation: A Heterogeneous Information Network Approach," WSDM, ACM, pp. 283-292 (2014).
Zeng et al., "Online Context-Aware Recommendation with Time Varying Multi-Armed Bandit," KDD, ACM, pp. 2025-2034 (2016).
Zheng et al., "DRN: A Deep Reinforcement Learning Framework for News Recommendation," www.acm, pp. 167-176 (2018).

* cited by examiner

Algorithm 1: The training process of GRC model.

Input: batch size $b_{size}$.

1 *Initialize parameters;*
2 TrainBatch = [];
3 for each *trial t* do
4     Observe features of all arms $\mathcal{A}^t$;
5     foreach *arm $a_k^t$ in the candidate pool $\mathcal{A}^t$* do
6         if *arm $a_k^t$ is new* then
7             Path = RandomWalk($G, a_k^t$);
8             initialize the embedding vector of $\theta_{a_k^t}$;
9         end
10         $\hat{r}_k^t = \overline{e_k^t} + ad_k^t$;
11     end
12     Choose arm $a_p^t = \arg\max_{a_k^t \in \mathcal{A}^t} \hat{r}_k^t$ and observe a real-valued reward $r_p^t$;
13     Sample a set of negative samples $\mathcal{A}_{neg}^t$ from the rest candidates in pool $\mathcal{A}^t$;
14     TrainBatch.append($u^t, a_p^t, r_p^t, [..., \hat{r}_k^t, ...], \mathcal{A}_{neg}^t$);
15     if *length*(TrainBatch) == $b_{size}$ then
16         calculate the loss;
17         *update all parameters by Adam Optimization;*
18         TrainBatch = [];
19     end
20 end

Figure 10

NEURAL CONTEXTUAL BANDIT BASED COMPUTATIONAL RECOMMENDATION METHOD AND APPARATUS

CROSS REFERENCE TO RELATED APPLICATIONS

This application is a continuation of and claims priority from U.S. patent application Ser. No. 16/839,436, filed Apr. 3, 2020, entitled NEURAL CONTEXTUAL BANDIT BASED COMPUTATIONAL RECOMMENDATION METHOD AND APPARATUS, the contents of which are hereby incorporated by reference.

FIELD OF THE DISCLOSURE

The present disclosure relates to improvements to automatic computerized systems and networks utilizing neural contextual bandit, and specifically to addressing issues including the cold start issue associated with computerized recommendation systems.

BACKGROUND

Currently, networked computerized recommendation systems use known information about users and items to make item recommendations to users. Personalized recommendation systems have been widely used in many real-world computing systems, such as electronic commerce, online, targeted advertising, online digital content (e.g., news, audio, multimedia, etc. content), etc. Effective personalized recommendations not only can help customers identify items of interest more efficiently.

Presently, recommendation systems rely on information about users and items to make an item recommendation to a user. For example, using a collaborative filtering approach, a recommendation system relies on knowledge about users' preferences in items to identify users with similar item preferences and then recommend an item preferred by one of the users to another one. Because it relies so heavily on knowledge about user-item preferences, the collaborative filtering approach is not well suited to situations in which such knowledge is limited or altogether nonexistent. The problem caused by a lack of knowledge has been referred to in the art as the cold start problem.

The cold start problem is particularly challenging for an online recommendation system which routinely encounters new users and new items that have little if any associated information. Such systems do not scale well when operating on a growing dataset (e.g., while information needed to determine user-item preferences is being collected). In some cases, such systems completely ignore previously-computed results and run from scratch on recent data without exploiting all available data, thus requiring more user interactions with the network and/or system, which unnecessarily increases network traffic and computer overhead.

SUMMARY

The present disclosure provides novel systems and methods for automatic item recommendation using latencies, such as and without limitation latent user-item relationships and latent user-item representations. The disclosed systems and methods improve on existing approaches and address the cold start problem, thus improving overall network and computational efficiency by yielding better results with fewer user interactions required.

Presently, attempts have been made at using a contextual bandit algorithm. However, these attempts are primarily limited to linear models and attempt to combine user and item feature embeddings via a simple concatenation.

In accordance with one or more embodiments, a graph-regularized cross-modal learning model (referred to herein as GRC) provides a framework, including a trained neural contextual bandit model) to model user-item interactions, adaptively learn the underlying representations of users or items (e.g., user's preference or item's characteristic) using exploration and exploitation strategies, and provide an expected reward (or payoff) representing a user's preference in connection with each of a number of items. The expected reward determined for each item can then be used to select a number of items (e.g., those items having the highest expected reward, or expected user preference).

The GRC's contextual bandit model disclosed herein uses exploitation (in a current round or trial) to maximize immediate reward given the current information (or context), and uses exploration to gather more unbiased samples to improve the accuracy of preference learning (for use in exploitation) in a subsequent round (or trial). In each round (or trial), the GRC updates user and item feature representations based on user-item interactions, and uses the updated user and item feature representations to determine an expected reward for each item in the current round.

In accordance with at least one embodiment, the user-item interaction used by the GRC comprises feedback provided by the user. The feedback can be in the form of positive user-item interactions (e.g., user selection of a recommended item) negative feedback (e.g., implied negative feedback such as a user ignoring a recommended item or express negative feedback, such as the user expressing a dislike for a recommended item), and unobserved user-item interactions (e.g., an item that has not yet been recommended to the user).

Current systems fail to consider the latent relationships between a user and items that have not yet been recommended to the user, e.g., the unobserved user-item feedback. As a result, current systems that ignore the latent relations among users and non-recommended items cannot properly reflect user's preferences in the real world.

In accordance with embodiments of the present disclosure, the GRC considers latent user-item relationships in determining a user's item preferences (or estimated rewards) and selecting the item(s) to recommend to the user. As a result, the GRC disclosed herein reflects a user's preferences in the real-world. In accordance with one or more embodiments, an unobserved item can be promoted (to increase its likelihood of being selected for recommendation) as part of the GRC's exploration for purposes of identifying user preferences.

In accordance with one or more embodiments, express negative user feedback (e.g., dislike) in connection with recommended items can inform the relationship between a user (or users) and other items with unobserved feedback (e.g., non-recommended items). In accordance with such embodiments, the latent relationship between a user and an item lacking feedback (or unobserved feedback), such as an item that has not yet been recommended can be promoted such that the item is more closely related to the user (in a feature space) than items with negative feedback (e.g., implied and/or express negative feedback).

In accordance with disclosed embodiments, the GRC disclosed herein addresses cold start issues associated with a new user or a new item. Cold start issues are particularly challenging in an online environment (e.g., an online provider distributing content to users), as new users and new items of content (e.g., news articles, advertising, music, images, etc.) continually arrive—a growing set of users and content.

In accordance with one or more embodiments, cold start issues can be addressed by discovering latent relationships in external information, such as social networking information and item categorization information. In accordance with at least one embodiment, a correlation graph representing social relationships between existing users (e.g., users with known user-item interaction information) and a new user (e.g., a user with little or no information, including little or no as user-item interaction information) can be used in generating an initial representation (e.g., an initial multi-dimensional feature vector user representation) for the new user for use by the GRC in determining an estimated reward for each of a plurality of items, which can be used in selecting the item(s) for recommendation to the new user. The initial representation determined for the new user can be updated and supplemented using additional information (e.g., unobserved and/or observed user-item interactions).

Similarly and with respect to a new item, an item-category correlation graph comprising item-category relationships including category relationships with existing items (e.g., items with user-item interactions) and category relationships with the new item can be used in generating an initial representation (e.g., an initial multi-dimensional feature vector item representation) of the new item for use by the GRC in determining an estimated reward for each of a plurality of users. For a given user, the estimated reward determined for the new item (using its initial representation) can be used to determine whether or not to recommend the item to the user. The initial representation determined for the new item can be updated and supplemented using additional information (e.g., user-item interactions).

In accordance with at least some embodiments, the GRC disclosed herein comprises a neural contextual bandit framework (for use in determining estimated rewards using user-item relationships in a feature space), cross-modal interaction modeling with metric learning (for use in modeling user feedback for use in determining user-item relationships) and graph-regularized embedding (for user in determining initial representations for new users and new items). In accordance with embodiments, the neural contextual bandit framework disclosed herein comprises a reward deviation with dropout neural network and a multi-layer perceptron (or MLP).

In accordance with at least one embodiment, the GRC disclosed herein uses a deep learning architecture to capture non-linear interactions between users and item, captures external network structure information of users and items via the graph-regularized embedding module, and captures both positive and negative user feedback as well as the implicit feedback from non-recommended item candidates via the metric learning component.

The disclosed systems and methods provide a set of recommended items to a user. The items can be any type of item, including without limitation content items such as and without limitation, books, music, audio, video, multimedia, image, advertising, etc. content. Other examples of items include without limitation products, goods, services, etc.

The disclosed systems and methods first receive an item recommendation request in connection with a user. The item recommendation can comprise one or more items selected for the user using an estimated reward determined for each item of a plurality of items. The disclosed systems and methods can use the GRC to generate an estimated reward for each item.

The disclosed systems and methods, in response to the item recommendation request, generate a representation for the user and a representation for each item of the plurality of items (e.g., recommendation candidates). A data store comprising information about the user and information about each of a plurality of items (or candidate items). The user information comprises information about the user (e.g., age, geographic location, gender, etc.), which can be used to generate a multi-dimensional feature vector user representation for the user. In a case that the user is a new user, the multi-dimensional feature vector user representation can comprise a representation (e.g., a low-dimensional representation) determined using graph-regularized embedding. The item information maintained in the data store can comprise information about each item (e.g., category, description, product features, title, artist, etc.) as well as feedback information corresponding to a user which can be used to generate a multi-dimensional feature vector item representation for each of the candidate items. In a case that one or more of the candidate items is a new item, the multi-dimensional feature vector item representation can comprise a representation (e.g., a low-dimensional embedding) determined using graph-regularized embedding.

The disclosed systems and methods then determine a plurality of user-item pairs in connection with a feature space. Each user-item pair relates the user with one of the candidate items. In accordance with one or more embodiments, the GRC's cross-modal interaction modeling with metric learning can be used to determine a distance (in the feature space) between the user's representation and each candidate item's representation. In accordance with one or more embodiments, feedback information associated with a candidate item can be used to assign the candidate item to one of a number of groups. The groups comprising a first group comprising each candidate item previously recommended to the user and having positive feedback of the user, a second group comprising each candidate item previously recommended to the user and having negative feedback of the user, and a third group comprising each candidate item having unobserved feedback of the user (e.g., the candidate items that have yet to be recommended to the user).

In accordance with one or more embodiments, the GRC cross-modal interaction modeling with metric learning learns a distance (e.g., a distance metric) which is used to position each item's representation relative to the user's representation in the feature space. In accordance with at least one such embodiment, the representation of each candidate item in the first and third groups is positioned more closely to the user's representation (in the feature space) than the representation of each candidate item in the in the second group.

The disclosed systems and methods then use the trained neural contextual bandit framework to determine an estimated reward for each candidate item using the user and candidate item representations in the feature space. The estimated reward determined for each candidate item is then used to select one or more candidate items for inclusion in the item recommendation, which is provided to the user in response to the item recommendation request.

In accordance with one or more embodiments, a method is disclosed which includes receiving, at a computing device, a request for an item recommendation in connection with a user; maintaining, via the computing device, a data store comprising information about the user and information about a plurality of items, the information about an item including feedback information corresponding to the user, the feedback information for use in grouping the plurality of items into at least three groups, a first group comprising each item previously recommended to the user and having positive feedback of the user, a second group comprising each item previously recommended to the user and having negative feedback of the user, and a third group comprising each unrecommended item without feedback of the user; determining, via the computing device, a multi-dimensional feature vector user representation corresponding to the user using the information about the user; determining, via the computing device, a plurality of item representations corresponding to the plurality of items, each item representation comprising a multi-dimensional feature vector item representation determined using information about the item from the item information store; determining, via the computing device, a plurality of user-item pairs in a feature space, each user-item pair, in the feature space, relating the user with one of the items of the plurality of items, the determining comprising, for a user-item pair, determining a distance, in the feature space, between the feature vector item representation and the feature vector user representation, the feature vector item representation for each item in the first and third groups being more closely positioned, in the feature space, to the feature vector user representation than each item in the second group; determining, via the computing device, a plurality of rewards for the plurality of user-item pairs, determination of a reward for a user-item pair comprising using a trained contextual bandit model to generate the reward using the feature space relating the user with each item of the plurality of items; automatically selecting, via the computing device and using the plurality of rewards, at least one item from the plurality of items for the recommendation, each selected item having a greater reward than each unselected item of the plurality; and communicating, via the computing device, the recommendation to a user for display on a device of the user.

In accordance with one or more embodiments, a non-transitory computer-readable storage medium is provided, the non-transitory computer-readable storage medium tangibly storing thereon, or having tangibly encoded thereon, computer readable instructions that when executed cause at least one processor to perform a method for automatically determining an item recommendation.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

DRAWINGS

The above-mentioned features and objects of the present disclosure will become more apparent with reference to the following description taken in conjunction with the accompanying drawings wherein like reference numerals denote like elements and in which:

FIGS. 5-10 are diagrams of exemplary examples of at least one non-limiting embodiment in accordance with some embodiments of the present disclosure.

DETAILED DESCRIPTION

Figure 1:
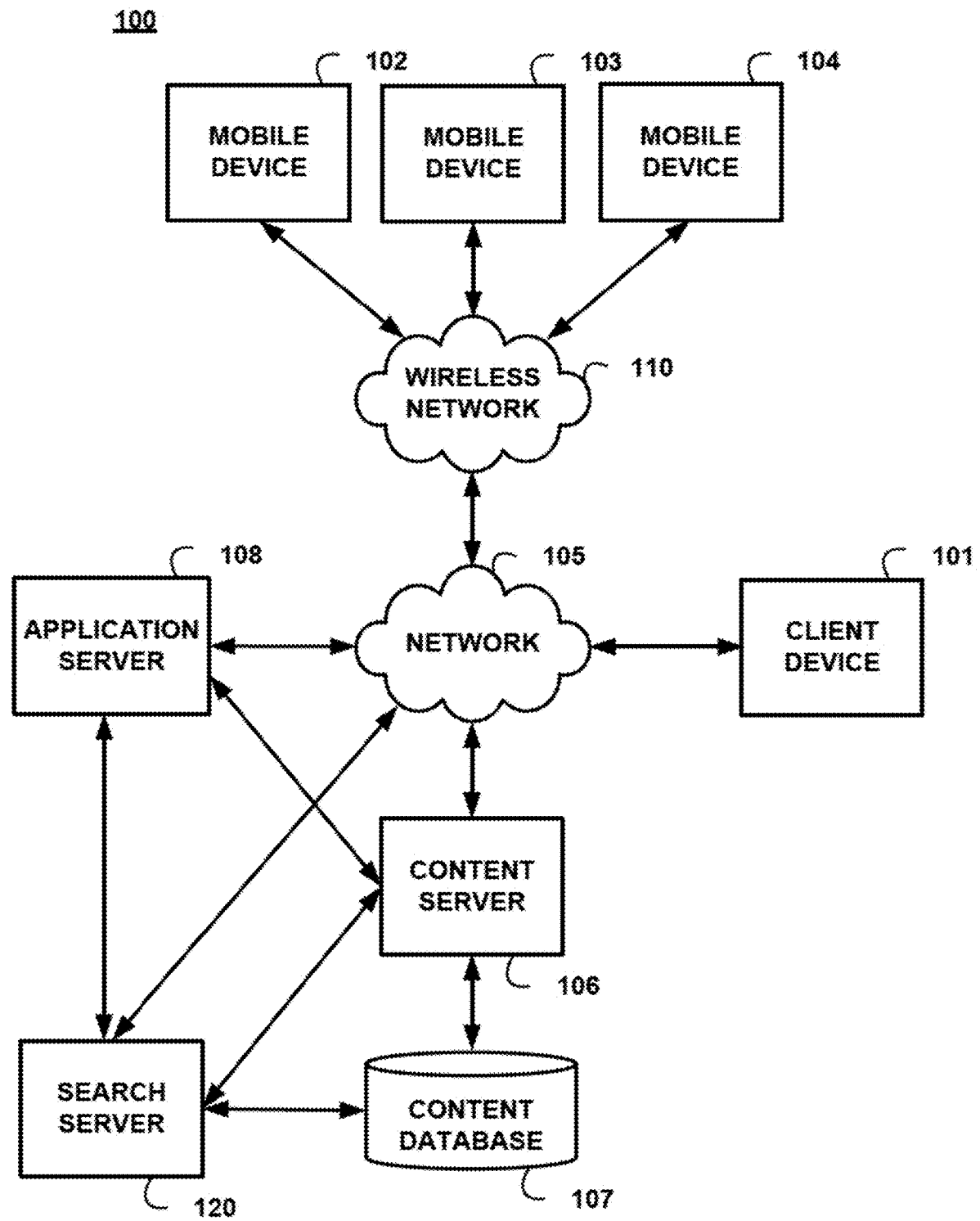
FIG. 1 is a schematic diagram illustrating an example of a network within which the systems and methods disclosed herein could be implemented according to some embodiments of the present disclosure.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo!® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing or displaying various forms of content, including locally stored or streamed video, or games (such as fantasy sports leagues). The foregoing is provided to illustrate that claimed subject matter is intended to include a wide range of possible features or capabilities.

The detailed description provided herein is not intended as an extensive or detailed discussion of known concepts, and as such, details that are known generally to those of ordinary skill in the relevant art may have been omitted or may be handled in summary fashion.

The instant disclosure provides a novel solution addressing the immediate demand for an automated system, application and/or platform that generates an item recommendation. According to some embodiments, the disclosed systems and methods responds to an item recommendation request for a given user by providing an item recommendation comprising a number of items identified using the GRC disclosed herein, which comprises neural contextual bandit framework (for use in determining estimated rewards using user-item relationships in a feature space), cross-modal interaction modeling with metric learning (for use in modeling user feedback for use in determining user-item relationships) and graph-regularized embedding (for user in determining initial representations for new users and new items). In accordance with embodiments, the neural contextual bandit framework disclosed herein comprises a reward deviation with dropout neural network and a multi-layer perceptron.

The disclosed systems and methods first receive an item recommendation request for a given user. The item recommendation can comprise one or more items selected for the user using an estimated reward determined for each item of a plurality of items. The disclosed systems and methods can use the GRC to generate an estimated reward for each item. In response to the received item recommendation request, a user representation is generated along with an item representation for each candidate item of a plurality of candidate items.

A user information store comprising user-item interactions as well as other information (e.g., age, geographic location, gender, etc.) can be used to generate a multi-dimensional feature vector user representation for the user. In a case that the user is a new user, the multi-dimensional feature vector user representation can comprise a representation (e.g., a low-dimensional representation) determined using graph-regularized embedding. The item information maintained in the data store can comprise information about each item (e.g., category, description, product features, title, artist, etc.) as well as feedback information corresponding to a user which can be used to generate a multi-dimensional feature vector item representation for each of the candidate items. In a case that one or more of the candidate items is a new item, the multi-dimensional feature vector item representation can comprise a representation (e.g., a low-dimensional embedding) determined using graph-regularized embedding.

The disclosed systems and methods then determine a plurality of user-item pairs in a feature space. Each user-item pair relates the user with one of the candidate items. In accordance with one or more embodiments, the GRC's cross-modal interaction modeling with metric learning can be used to determine a distance (in the feature space) between the user's representation and each candidate item's representation. In accordance with one or more embodiments, feedback information associated with a candidate item can be used to assign the candidate item to one of a number of groups. The groups comprising a first group comprising each candidate item previously recommended to the user and having positive feedback of the user, a second group comprising each candidate item previously recommended to the user and having negative feedback of the user, and a third group comprising each candidate item having unobserved feedback of the user (e.g., the candidate items that have yet to be recommended to the user).

In accordance with one or more embodiments, the GRC cross-modal interaction modeling with metric learning learns a distance (e.g., a distance metric) which is used to position each item's representation relative to the user's representation in the feature space. In accordance with at least one such embodiment, the representation of each candidate item in the first and third groups is positioned more closely to the user's representation (in the feature space) than the representation of each candidate item in the in the second group.

The disclosed systems and methods then use the trained neural contextual bandit framework to determine an estimated reward for each candidate item using the user and candidate item representations in the feature space. The estimated reward determined for each candidate item is then used to select one or more candidate items for inclusion in the item recommendation, which is provided to the user in response to the item recommendation request.

Certain embodiments will now be described in greater detail with reference to the figures. The following describes components of a general architecture used within the disclosed system and methods, the operation of which with respect to the disclosed system and methods being described herein. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as, by way of non-limiting examples, content server 106, application (or "App") server 108, search server 120 and advertising ("ad") server (not shown).

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, searching for, viewing and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within or accessible to an electronic social networking site. A social network refers generally to an electronic network of individuals, such as acquaintances, friends, family, colleagues, or co-workers, which are coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site or service, such as streaming media site/service (e.g., YouTube®), an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a video application and/or video platform, can be provided via the application server 108, whereby a user is able to utilize such service upon the user being authenticated, verified or identified by the service. Examples of content may include images, text, audio, video, or the like, which may be processed in the form of physical signals, such as electrical signals, for example, or may be stored in memory, as physical states, for example.

An ad server comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo! ®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108 and 120 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108 and/or 120. This may include in a non-limiting example, authentication servers, search servers, email servers, social networking services servers, SMS servers, IM servers, MMS servers, exchange servers, photo-sharing services servers, and travel services servers, via the network 105 using their various devices 101-104. In some embodiments, applications, such as a streaming video application (e.g., YouTube®, Netflix®, Hulu®, iTunes®, Amazon Prime®, HBO Go®, and the like), blog, photo storage/sharing application or social networking application (e.g., Flickr®, Tumblr®, and the like), can be hosted by the application server 108 (or content server 106, search server 120 and the like). Thus, the application server 108 can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108, 120, or an ad server or ad network.

Moreover, although FIG. 1 illustrates servers 106, 108 and 120 as single computing devices, respectively, the disclosure is not so limited. For example, one or more functions of servers 106, 108 and/or 120 may be distributed across one or more distinct computing devices. Moreover, in one embodiment, servers 106, 108 and/or 120 may be integrated into a single computing device, without departing from the scope of the present disclosure.

Figure 2:
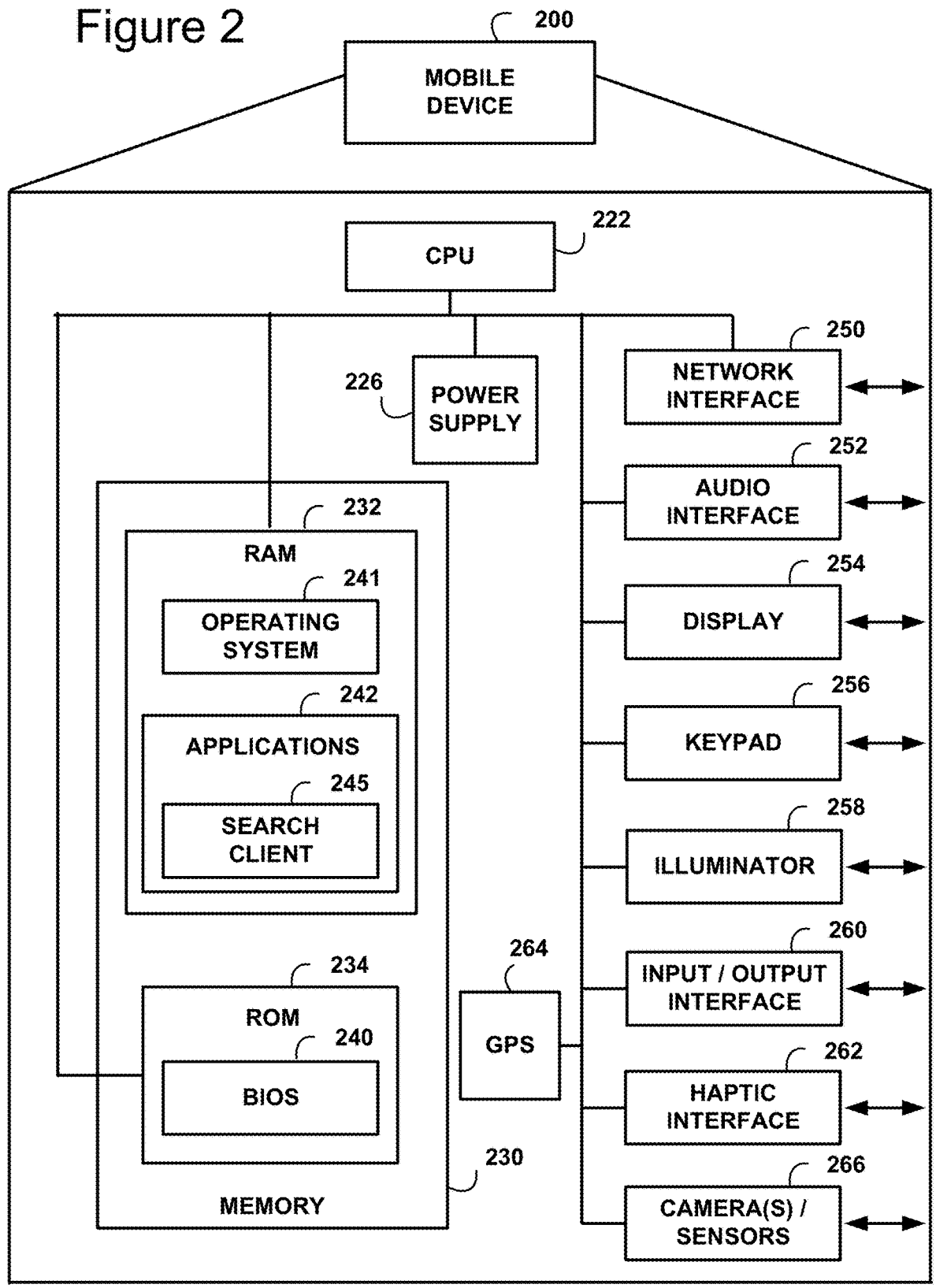
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies as discussed above. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the client device 200 receives a communication from another user.

Optional GPS transceiver 264 can determine the physical coordinates of client device 200 on the surface of the Earth, which typically outputs a location as latitude and longitude values. GPS transceiver 264 can also employ other geopositioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, client device 200 may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by client device 200 to store, among other things, applications 242 and/or other data. For example, data stores may be employed to store information that describes various capabilities of client device 200. The information may then be provided to another device based on any of a variety of events, including being sent as part of a header during a communication, sent upon request, or the like. At least a portion of the capability information may also be stored on a disk drive or other storage medium (not shown) within client device 200.

Applications 242 may include computer executable instructions which, when executed by client device 200, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query message, where another search client manages search results, and yet another search client is configured to manage serving advertisements, IMs, emails, and other types of known messages, or the like.

Figure 3:
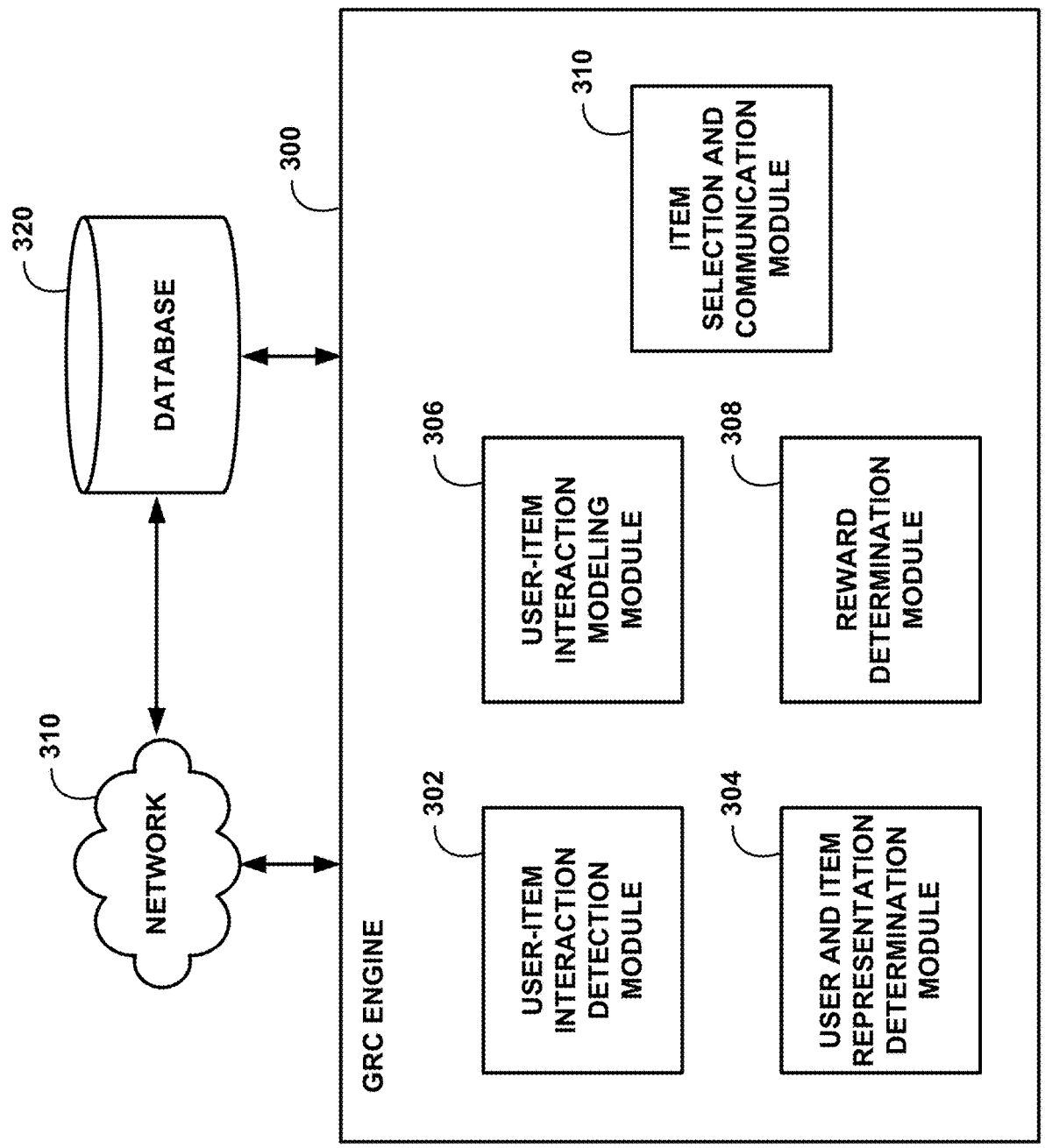
FIG. 3 is a schematic block diagram illustrating components of an exemplary system in accordance with embodiments of the present disclosure.

FIG. 3 is a block diagram illustrating the components for performing the systems and methods discussed herein. FIG. 3 includes a GRC engine 300, network 310 and database 320. The GRC engine 300, which is not a conventional system or process known in the art, can be a special purpose machine or processor and could be hosted by an application server, content server, social networking server, web server, search server, content provider, email service provider, ad server, user's computing device, and the like, or any combination thereof.

According to some embodiments, GRC engine 300 can be embodied as a stand-alone application that executes on a user device. In some embodiments, the GRC engine 300 can function as an application installed on the user's device, and in some embodiments, such application can be a web-based application accessed by the user device over a network.

The database 320 can be any type of database or memory, and can be associated with a server on a network (such as and without limitation a content server, search server, application server, etc.,) or a user's device. Database 320 comprises a dataset of data and metadata associated with local and/or network information related to users, services, applications, content (e.g., video) and the like. Such information can be stored and indexed in the database 320 independently and/or as a linked or associated dataset. It should be understood that the data (and metadata) in the database 320 can be any type of information and type, whether known or to be known, without departing from the scope of the present disclosure.

According to some embodiments, database 320 can store data for users, e.g., user data. According to some embodiments, the stored user data can include, but is not limited to, information associated with a user's profile, user interests, user behavioral information, user attributes, user preferences or settings, user demographic information, user location information, user biographic information, and the like, or some combination thereof. In some embodiments, the user data can also include, for purposes creating, recommending, rendering and/or delivering GIFs or videos, user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 can store data associated with user-item interactions (e.g., user feedback, such as negative, positive and unobserved feedback), item recommendations from the current and previous rounds, item information (e.g., item descriptive information such as and without limitation, title, uniform product code, color, size, title, author, size, etc.), user information (such as and without limitation the user information discussed above), user and item representations (e.g., feature vector representations), model training data, learned model parameters, information from external sources (e.g., social networking system data and item-category relationship data), etc.

The network 310 can be any type of network such as, but not limited to, a wireless network, a local area network (LAN), wide area network (WAN), the Internet, or a combination thereof. The network 310 facilitates connectivity of the GRC engine 300, and the database of stored resources 320. Indeed, as illustrated in FIG. 3, the GRC engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as GRC engine 300, and includes user-item interaction detection module 302, user and item representation determination module, user-item interaction determination module 306, reward determination module 308 and item selection and communication module 310. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed with reference to FIG. 4.

As discussed in more detail below, the information processed by the GRC engine 300 can be supplied to the database 320 in order to ensure that the information housed in the database 320 is up-to-date as the disclosed systems and methods leverage real-time information and/or item recommendation and user-item interaction information associated with a given round (or trial) of the GRC engine 300, which information can be used, inter alia, in connection with subsequent rounds of the GRC engine 300 and for training the GRC 300, as discussed in more detail below.

Figure 4:
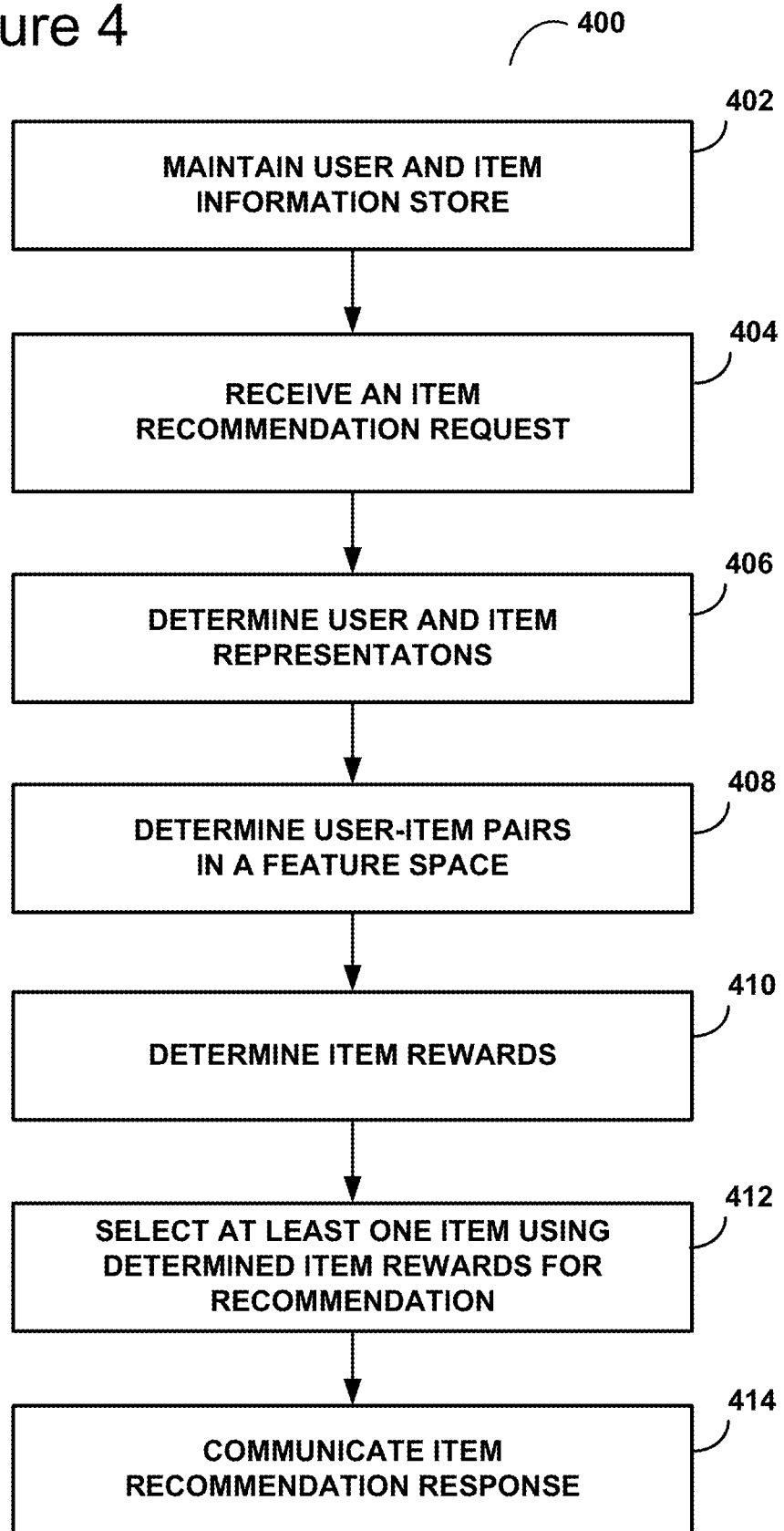
FIG. 4 is a flowchart illustrating steps performed in accordance with some embodiments of the present disclosure.

FIG. 4 provides a process flow overview in accordance with one or more embodiments of the present disclosure. Process 400 of FIG. 4 details steps performed in accordance with exemplary embodiments of the present disclosure for automatically generating an item recommendation. According to some embodiments, as discussed herein with relation to FIG. 4, the process involves automatically generating, for a given user, an item recommendation comprising a number of items having an estimated reward (indicative of a user preference and likelihood of positive feedback) that is higher (or greater) than unselected items. Embodiments of the present disclosure use a neural contextual bandit framework comprising a reward deviation (with dropout layers) neural network and a multi-layer perception to generate the estimated rewards used in item selection.

The neural contextual bandit framework generates an estimated reward for each of a plurality of candidate items using user and item representations positioned (e.g., in a feature space) based on a similarity measure (e.g., a distance metric) determined in accordance with user feedback associated with each item (or candidate item or item that is a candidate for selection), as discussed in more detail below.

At step 402, which is performed by user-item interaction detection module 302, user feedback associated with a plurality of items (or candidate items) from previous rounds that may have occurred is collected and stored in a data store. The user feedback includes feedback provided by the user in connection with items recommended to the user in a previous round. Item feedback is also referred to herein user-item interaction. The feedback can be in the form of a positive user-item interaction (e.g., user selection of a recommended item) negative feedback (e.g., implied negative feedback such as a user ignoring a recommended item or express negative feedback, such as the user expressing a dislike for a recommended item), and unobserved user-item interactions (e.g., an item that has not yet been recommended to the user).

In accordance with one or more embodiments, the data store can include user information in addition to a user's item interactions, such as age, geographic location, gender, etc., as discussed herein. The data store can include information about an item in addition to user feedback, such as and without limitation category, description, product features, title, artist, etc., as discussed herein.

At step 404, a request is received by GRC engine 300. The request comprises a request for an item recommendation in connection with a user.

At step 406, which is performed by user and item representation determination module, a representation (e.g., a multi-dimensional feature vector user representation) of the user is determined using the information about the user maintained at step 402. In a case that the user is a new user, the multi-dimensional feature vector user representation can comprise a representation (e.g., a low-dimensional representation) determined using graph-regularized embedding, as is discussed herein in connection with FIG. 9.

In addition and at step 406, a representation is determined for each item of the plurality of items. The item information maintained in the data store (e.g., user feedback information, category, description, product features, title, artist, etc.) can be used to generate a multi-dimensional feature vector item representation for each of the candidate items. In a case that a candidate items is a new item, the multi-dimensional feature vector item representation can comprise a representation (e.g., a low-dimensional embedding) determined using graph-regularized embedding, which is discussed in more detail below in connection with FIG. 9.

At step 408, which is performed by user-item interaction determination module 306, the user representation is paired with each of the item representations in a feature space in accordance with the user's feedback maintained at step 402. In accordance with one or more embodiments, cross-modal interaction modeling with metric learning is used by the user-item interaction determination module 306 to determine a distance (in the feature space) between the user's representation and each candidate item's representation.

In accordance with one or more embodiments, the cross-modal interaction modeling uses feedback information associated with a candidate item to determine which group (of a number of groups) the candidate item belongs. In accordance with one or more such embodiments, the groups comprise a first group of candidate items previously recommended to the user and having positive feedback of the user, a second group of candidate items previously recommended to the user and having negative feedback of the user, and a third group of candidate items having unobserved feedback of the user (e.g., the candidate items that have yet to be recommended to the user, including new items and items that have not yet been selected for inclusion in an item recommendation).

At step 410, which is performed by reward determination module 308, the user and item representations (together with their interrelationships in feature space) determined at steps 406 and 408 are used to determine an estimated reward (e.g., an estimated user preference and likelihood of positive user feedback) for each item of the plurality of items. As discussed below, module 308 can use a trained neural contextual bandit framework comprising a reward deviation with dropout neural network together with a multi-layer perceptron to determine the estimated reward for each candidate item.

At step 412, which is performed by item selection and communication module 310, the estimated reward determined for each candidate item is then used to select one or more candidate items for inclusion in the item recommendation. The item recommendation comprising a number of selected items can then be provided to the user. For example, the item recommendation comprising at least one item is transmitted, via an electronic communications network, to a computing device for display at the computing device of the user. In accordance with at least one embodiment, transmission of the item recommendation to the user computing device results in the item recommendation being displayed at the user computing device. The item recommendation can be displayed as a listing of one or more items for selection by the user. In accordance with one or more embodiments, a recommended item (e.g., a content item) can be output (e.g., via a display and/or speaker) at the user computing device.

In accordance with one or more embodiments, GRC 300 can be used in connection with a number of users, I (e.g., uses designated as $u_1, \ldots, u_i, \ldots, u_I$) and J items (e.g., items designated as $v_1, \ldots, v_j, \ldots, v_J$). For purposes of illustration, the index of user i is represented as $u_i$ and the index of item j is represented as $v_j$ herein. In accordance with at least one embodiment, GRC 300 addresses the multi-armed bandit problem, where each arm corresponds to a candidate item. In each round (or trial) t, GRC 300 selects at least one item (or arm) to recommend to a user from a set of candidate items (or arms). In trial t, the set of candidate items can be denoted as $A^t = \{a_1^t, \ldots, a_k^t, \ldots, a_K^t\}$, where K is the number of items indexed by k.

Figure 5:
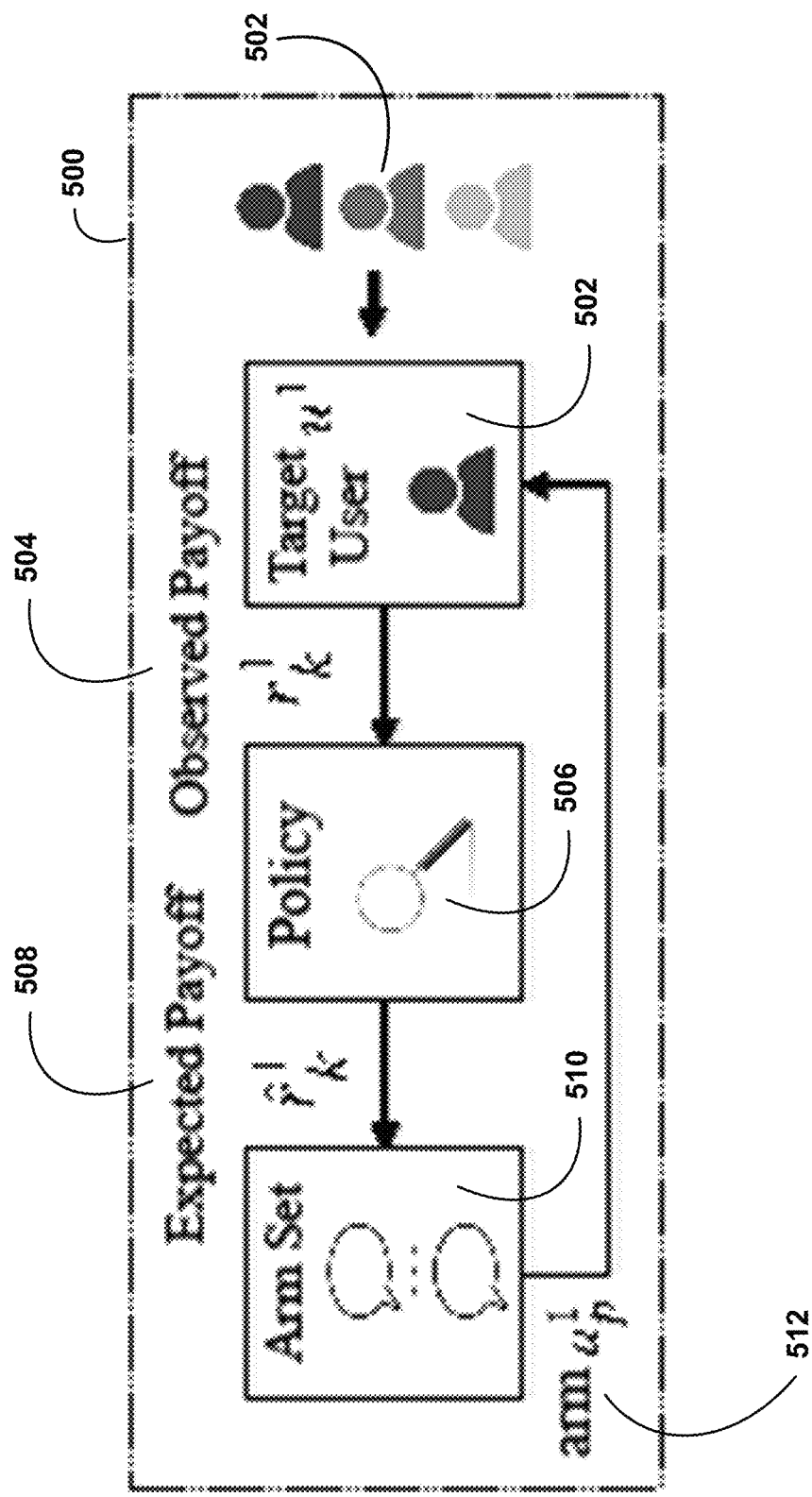

FIG. 5 provides an exemplary example of a trial, or round, in which an item is selected from the set of candidate items accordance with one or more embodiments of the present disclosure. The example illustrates a round 500. In the example, the round is t=1. The target user 502 is the intended user (also referred to as $u^1$) in the example. The item (or arm), $a_p^1$, selected (or pulled) in round 1 in the example 500 is designated as $a_p^1$. The observed payoff (or reward) 504 (also designated as $r_k^1$) indicates the observed user-item interaction (e.g., whether the user selected, ignored, disliked, unobserved, etc. a selected item). As discussed herein, the observed payoff from any previous rounds becomes input to a policy 506 which is implemented by GRC 300.

In accordance with one or more embodiments, GRC 300 implements policy 605 and determines an expected payoff 508 (or expected reward, which is also designated as $\hat{r}_k^1$) for each of the items (or arms) in the set 510, and the set of expected payoffs can be used by GRC 300 to select an item (or items) for recommendation to the user (e.g., target user, $u^1$). In the example, the observed and expected rewards associated with the $k^{th}$ item are denoted as $r_k^1$ and $\hat{r}_k^1$, respectively. In the example, a selected item (denoted as $a_p^1$) is communicated to the target user and the user's interaction is observed for use in updating GRC 300 for a subsequent round.

Figure 6:
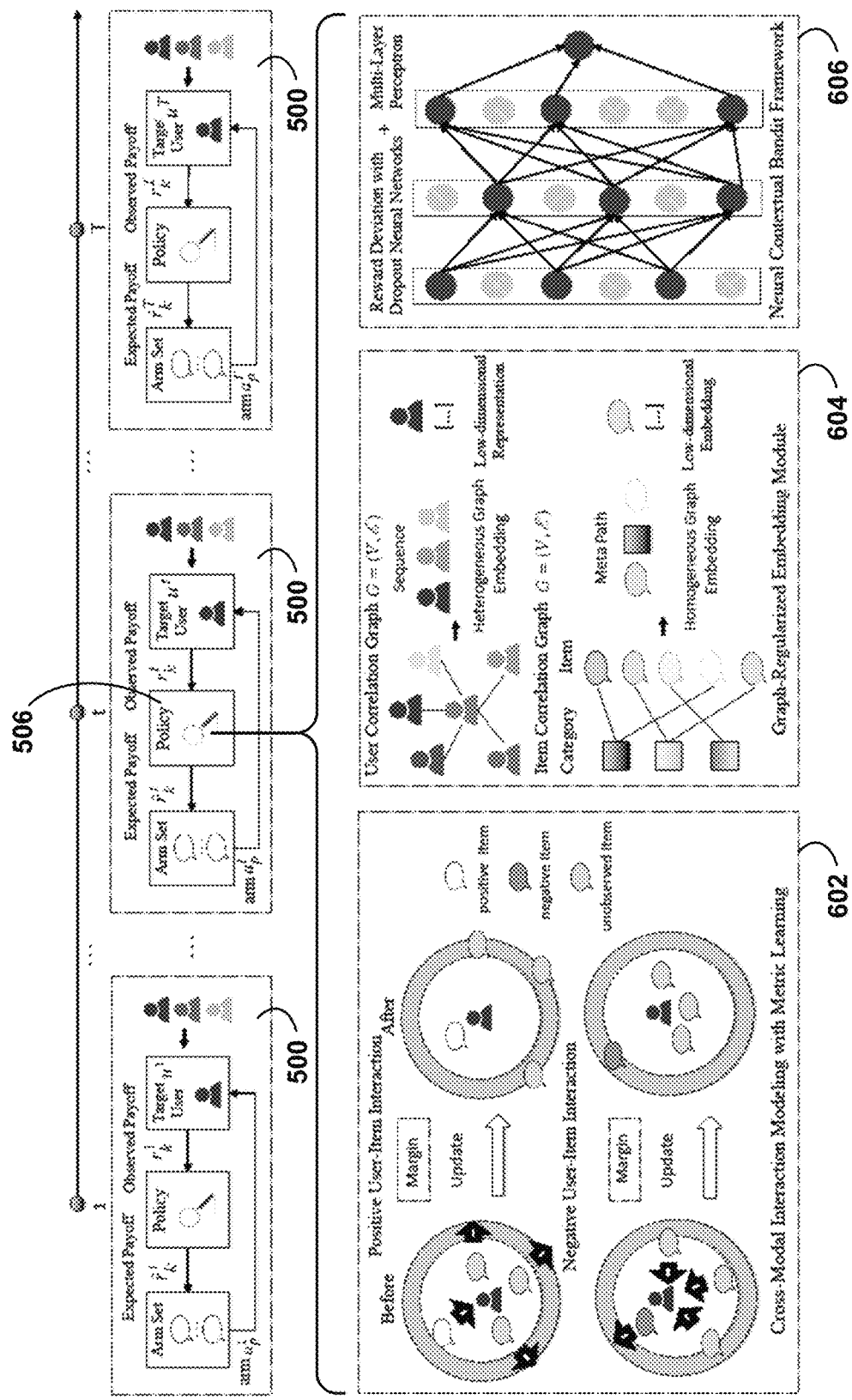

FIG. 6 provides an exemplary example involving a number T rounds. In each round 500, at least one item is selected for inclusion in an item recommendation for presentation to the user. In accordance with one or more embodiments, GRC 300 implements policy 506, which comprises components 602, 604 and 606. In accordance with one or more such embodiments, components 602, 604 and 606 (of policy 600 provided by GRC 300) are performed by user-item interaction modeling module 306 (e.g., using cross-modal interaction modeling with metric learning), user and item representation determination module 304 (e.g., using graph-regularized embedding) and reward determination module 308 (e.g., using a neural contextual bandit framework comprising a reward deviation with dropout neural network and multi-layer perceptron), respectively.

At each round t, the GRC 300 observes a given user $u_i$, from the set of users and K candidate items (also referred to herein as arms), and at least one item is selected for recommendation to the user using policy 506. In the example shown in FIGS. 5 and 6, a single item is selected. It should be apparent that more than one item can be selected in a given round.

Figure 7:
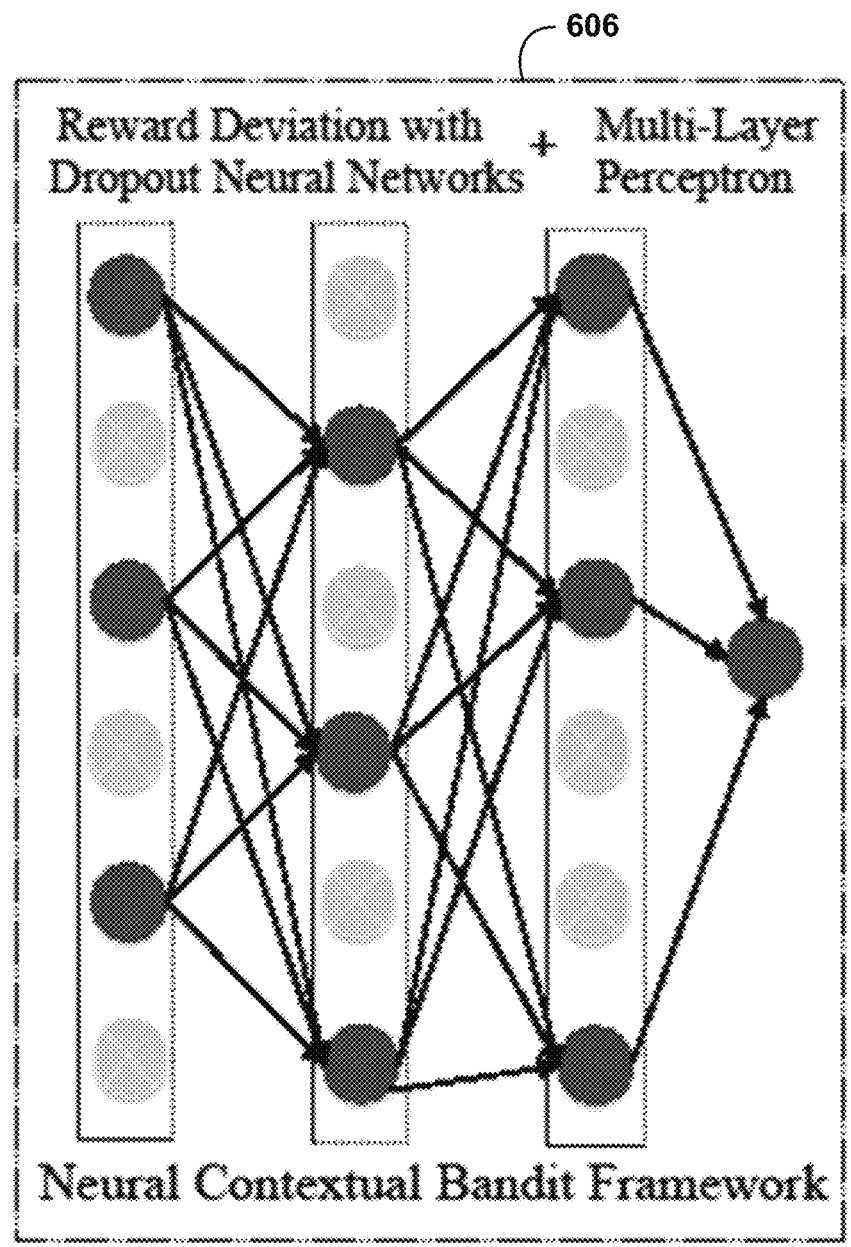

As discussed herein and in accordance with one or more embodiments, component 606 is implemented by reward determination module 308. Reference is made to FIG. 7 wherein Component 606 is discussed further. In accordance with one or more embodiments, reward determination module 308 comprises the neural contextual bandit framework, which comprises a neural network with dropout layers and a multi-layer perceptron.

As discussed herein, in an exploitation mode, the neural contextual bandit framework 606 uses its training to generate an item recommendation (comprising a number of items) for a user, and in an exploration mode, the neural contextual bandit framework 606 uses the user's feedback (e.g., positive, negative, unobserved, etc.) for training its neural network model using the knowledge collected about the user.

In accordance with at least one such embodiment, reward determination module 308 uses the framework 606 to determine, for each candidate item, an estimated reward and a reward deviation, and then uses the determined reward estimation and reward deviation to determine an expected payoff (or expected reward) for the candidate item. In accordance with at least one embodiment, the output of the final layer of the multi-layer perceptron is the reward expectation for each candidate item. As is discussed in more detail below, the neural contextual bandit framework 606 comprises a dropout neural network which is used in determining an item's reward deviation.

In accordance with one or more embodiments, the item selection and communication module 310, selects at least one item with the highest expected reward(s) to recommend to user i at round (or trial or timestamp) t, and then receives the user's feedback. In accordance with at least one embodiment, the neural contextual bandit framework 606 (of module 308) is trained to maximize the accumulated rewards (e.g., achieve a highest long-term reward). The notion of maximizing the accumulated rewards $R_T$ for the previous T trials can be expressed as follows:

$$R_T = \sum_{t=1}^{T} r_k^t, \quad \text{Expression (1)}$$

where $r_k^t$ is the observed reward of presented item $a_k^t$ selected by GRC 300 at trial, t. In accordance with at least one embodiment, an item that is selected, in each trial t, is the item(s) associated with the highest estimated reward, $\hat{r}_k^t$ relative to the unselected items.

In accordance with at least one such embodiment, a reward mapping function that is trained to infer the item with the highest reward for purposes of selection can be used by the neural contextual bandit framework 606. The reward mapping function can a reward expectation mapping function and a reward deviation mapping function. The reward expectation mapping function can be used to estimate the user's interest in an item. The reward deviation mapping function can be used to apply an upper confidence bound to assess uncertainty and improve the learning accuracy. A smaller confidence interval indicates a lower uncertainty in the derived reward and a larger confidence interval indicates that the derived reward has a higher uncertainty. The reward mapping function is discussed in more detail below with reference to Expressions (3) and (4).

In accordance with at least one embodiment, in trial t, the feature vector user representation $\theta_{u_i^t}$ (e.g., a multi-dimensional feature vector) is combined with an item's feature vector item representation $\theta_{a_k^t}$ (e.g., a multi-dimensional feature vector) to yield an integrated feature vector (or embedding) $x_k^t$ which becomes input to the multi-layer perceptron. In accordance with one or more embodiments, the user and item feature vectors can be concatenated to yield the $x_k^t$ feature vector.

In accordance with at least one embodiment, the output of a final layer in the multi-layer perceptron (of the neural contextual bandit framework 606) of module 308 of GRC 300 comprises an expected reward $e_k^t$ (also referred to herein as expected payoff and reward expectation) for each candidate item. Expression (2) below provides an example of a representation of the multi-layer perceptron in accordance with at least one embodiment:

$$z_1 = \emptyset_1(W_1 z_0 + b_1)$$
$$\ldots$$
$$z_L = \emptyset_L(W_L z_{L-1} + b_L)$$
$$\hat{y} = W_0 z_L + b_0,$$

Expression (2)

where L is the number of hidden layers (indexed by l). For the l layer, $\emptyset_n$, $W_n$ and $b_n$ represent an activation function (e.g., ReLU or tanh) of the MLP layers and learnable parameters. The contextual vector $x_k^t$ resulting from the integration of the user and item feature vectors is input to the multi-layer perceptron (e.g., $z_0 = x_k^t$), and the reward expectation output by the multi-layer perceptron for the item can be expressed as $e_k^t = MLP(x_k^t)$. In accordance with one or more embodiments, GRC 300 generates a reward expectation $e_k^t = MLP(x_k^t)$ for each candidate item, and the reward expectations determined for the candidate items are used to select at least one item (from the set of candidate items) which has the highest (or greatest) reward expectation than each of the unselected items.

In accordance with embodiments of the present disclosure, the neural contextual bandit framework 606 is trained to provide the reward deviation function, which can be used to apply an upper confidence bound to assess uncertainty of the reward expectation (which can operate to form unbiased samples by selecting items with high uncertainty to improve the learning accuracy). Previously, deriving an upper confidence bound for uncertainty estimation has been challenging, since the context information is provided in a dynamic environment and is not highly correlated with previous states and actions.

Embodiments of the present disclosure address the reward derivation problem using dropout layers (of the neural contextual bandit framework 606) to learn the reward mapping function by unifying the strengths of neural network models and stochastic modeling. Particularly, to supercharge the model with arbitrary depth and nonlinearities, dropout can be applied before every weight layer, which is mathematically equivalent to an approximation to the probabilistic deep Gaussian process.

With the neural contextual bandit framework 606 iterating to convergence, uncertainty estimates can be extracted from the dropout neural networks. In accordance with at least one embodiment, sampling N times from Bernoulli(n, p') distribution of network configurations for each layer l can be performed to obtain its corresponding parameters $\{W^1, \ldots, W^N\}$. Here $W^N = \{W_1^N, \ldots, W_L^N\}$ are the L weight matrices sampled in the $t^{th}$ iteration. Then, the Monte Carlo estimates can be evaluated with the input variables as:

$$\overline{e_k^t} \approx \frac{1}{N}\sum_{n=1}^{N} e_k^{(t,n)} = \frac{1}{N}\sum_{n=1}^{N} MLP^{(n)}(x_k^t),$$

Expression (3)

where $MLP^{(n)}$ represents the multi-layer perceptron with parameter set $W^n$. Expression (3) can be used to determine the reward expectation for a candidate item. Expression (4) below can be used to determine a reward deviation for a candidate item:

$$d_k^t \approx \tau^{-1} + \frac{1}{N}\sum_{n=1}^{N}\left[(e_k^{(t,n)})^2 - (\overline{e_k^t})^2\right],$$

Expression (4)

where $\tau$ is the model precision, which is defined as $$\tau := \frac{pl^2}{2N\lambda}.$$

The collected results of stochastic forward passes through the model, can be incorporated into our neural network model which is trained with dropout mechanism.

In accordance with one or more embodiments, the expected reward (or expected payoff) 508 determined by policy 506 (implemented by the reward determination module 308 of GRC 300) can be the summation of the reward expectation determined using Expressions (3) and the reward deviation determined using (4). In accordance with one or more such embodiments, a coefficient α can be used to balance the exploration and exploitation aspects of the neural contextual bandit framework 606.

In accordance with one or more embodiments, component 602 (which is provided by user-item interaction detection module 304) observes user-item interactions and determines a user's relationship with candidate items using the observations. Embodiments of the present disclosure make use of an expanded level of observation, including a number of different user-item interactions (i.e., positive, negative and unobserved), and metric learning to learn a distance metric to make certain items more similar to the user such that the corresponding user-item pairs are closer to each other (in a feature space using by the neural contextual bandit framework 606) and make certain items less similar to the user such that the corresponding user-item pairs are further apart (in the feature space).

In accordance with one or more embodiments, to capture the dependencies among positive, negative and unobserved user-item interactions, latent relations (e.g., unobserved interactions) between users and items can be modeled using triangle inequality relation structures. It is assumed that users are more likely to be more related with items in which they are interested than those in which they are not interested. This assumption can be enabled using the user and item feature vectors in a feature space. Given a user's feature vector representation, $\theta_{u_i^t}$, the feature vector representations of selected items (e.g., items with positive feedback) are expected to be closer to $\theta_{u_i^t}$ than the representations of unobserved items. With respect to unobserved items, their feature vector representations can be made to be closer to $\theta_{u_i^t}$ than the representations of items with negative feedback (including ignored items—items that are recommended but not selected by the user). In this way, positive and negative interactions as well as the implicit feedback of those ignored candidate items can be incorporated into reward determination.

In accordance with one or more embodiments, metric learning can be used to determine a distance metric (or measure) for a given item in connection with a user. The distance metric can be used as a measure of the relationship (e.g., similarity or dissimilarity) between the user and the item. The metric learning can be generally expressed using the following exemplary item groups:

(i) For an item that is chosen for recommendation and that receives positive feedback from the user at trial t (indicating that the user is interested in the item), the metric learning function of component 602 can guide a representation learning process to make the feature vector user representation and the item's feature vector representation closer (in a feature space) to each other (make them more similar) relative to items belonging to groups (ii) and (iii) discussed below).

(ii) An item that is recommended to the user and has negative user feedback (e.g., express feedback in the form of a dislike, implied negative feedback in the form of the user ignoring a recommended item), the metric learning function can guide the representation learning process such that the item's feature vector representation is farther away from (more dissimilar to) the feature vector user representation than each feature vector item representation corresponding to an unchosen item (group (iii) discussed below); and (iii) For an item that has not yet been chosen for recommendation to the user, the metric learning function can guide the representation learning process to make the item's feature vector representation closer to the feature vector user representation than the feature vector item representation of each item belonging to group (ii) (discussed above). This grouping facilitates exploration, since unchosen items can have an increased likelihood of being chosen for recommendation to the user in a subsequent trial (e.g., trial t+1).

In accordance with at least one embodiment, using the above points, the metric learning function of component 602 can guide a representation learning process to learn a feature space comprising the user's feature vector representation and a feature vector representation for each item, where a distance metric determined for each user-item pair can be used to position the item's feature vector representation relative to the user's feature vector representation in the feature space. The distance metric being determined based on which group the item belongs.

Figure 8:
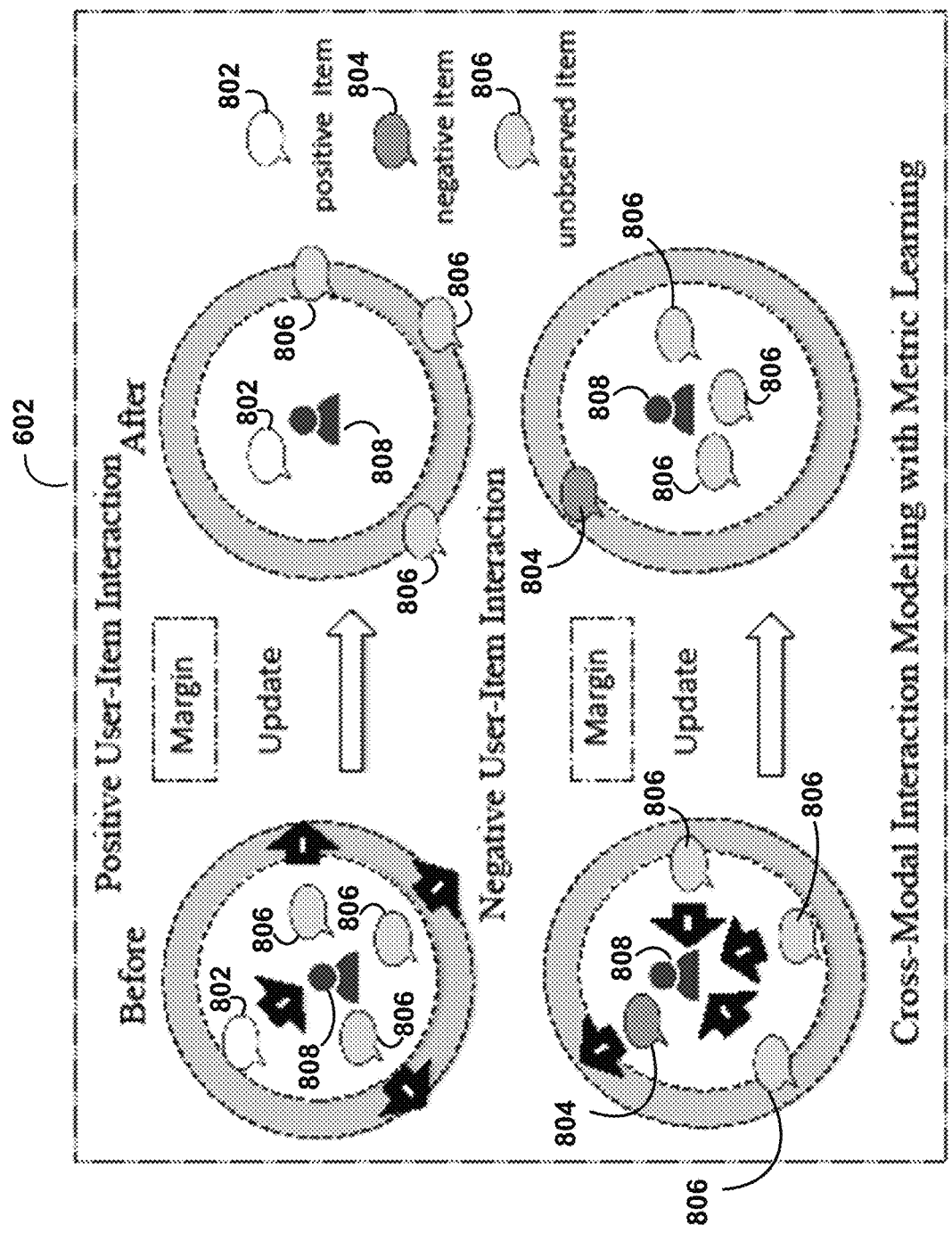

FIG. 8 provides an exemplary example of a positioning of items relative to a user based on feedback associated with the items. In a "Before" portion of the example, before using the metric learning function, there is no deliberate positioning of items based on user feedback. The example includes a number of positive items 802, negative items 804 and unobserved items 806. The metric learning function of component 602 guides the representation learning process to represent the feature vector user and item representations (in a feature space) which is shown in the "After" portion of the example. In the example, the feature vector representation of each positive item 802 is closer to the user's feature vector representation than the feature vector representation of each unobserved item 806 and the feature vector representation of unobserved item 806 is closer to the user than the feature vector representation of each negative item 804.

In accordance with at least one embodiment, the user-item feedback (e.g., positive, negative and unobserved) can be used in determining at least three groups of items, a first group comprising each item previously recommended to the user and having positive feedback of the user, a second group comprising each item previously recommended to the user and having negative feedback of the user, and a third group comprising each unrecommended item without feedback of the user.

In accordance with at least one embodiment, the metric learning function of component 602 can guide the representation learning process to determine a distance, in the feature space, between each feature vector item representation and the feature vector user representation, such that the feature vector item representation for each item in the first and third groups are more closely positioned, in the feature space, to the feature vector user representation than each item in the second group.

In accordance with at least one embodiment, the metric learning function can be expressed as:

$$\mathcal{L}_{Metric} = \Sigma \Big( \Sigma_{a_k^t \in \mathcal{A}_{neg}^t} r_p^t \Big[ m + \big\| \theta_{u_i^t} - \theta_{a_p^t} \big\|_2^2 - \big\| \theta_{u_i^t} - \theta_{a_k^t} \big\|_2^2 \Big]_+ +$$
$$(1 - r_p^t) \Big[ m + \big\| \theta_{u_i^t} - \theta_{a_k^t} \big\|_2^2 - \big\| \theta_{u_i^t} - \theta_{a_p^t} \big\|_2^2 \Big]_+ \Big),$$

Expression (5)

$\mathcal{A}_{neg}^t$ is sampled from the rest of the candidate arms in pool $\mathcal{A}^t$. In addition, $\|\cdot\|_2$ denotes the 2-norm. Note that, in accordance with at least one embodiment, the feature vector and embedding vector share the same dimension size. $[\cdot]_+ = \max(\cdot, 0)$ can be a standard hinge loss, and m indicates a positive margin value.

Embodiments of the present disclosure address cold start issues associated with new users and items. Incomplete contextual features for users and items (which typically occurs with a new user or new item) are encountered by most recommendation systems. The sparseness of information about users and items results in the cold start issues. Embodiments of the present disclosure address the sparseness of information using knowledge gained from external sources. In accordance with at least one embodiment, graph-regularized embedding is used by user and item representation determination module 304 (of GRC 300) to bridge user behavior modeling with correlation graph embedding, such that the external knowledge of users and items can be leveraged to guide cross-modal embedding and jointly alleviate data incompleteness and sparseness (e.g., cold start issues).

The graph-regularized embedding disclosed herein learns latent representations of incoming users or items by leveraging their explicit connections with existing users and items. Example of explicit connections include users' social network(s) and categorical dependencies between items.

Figure 9:
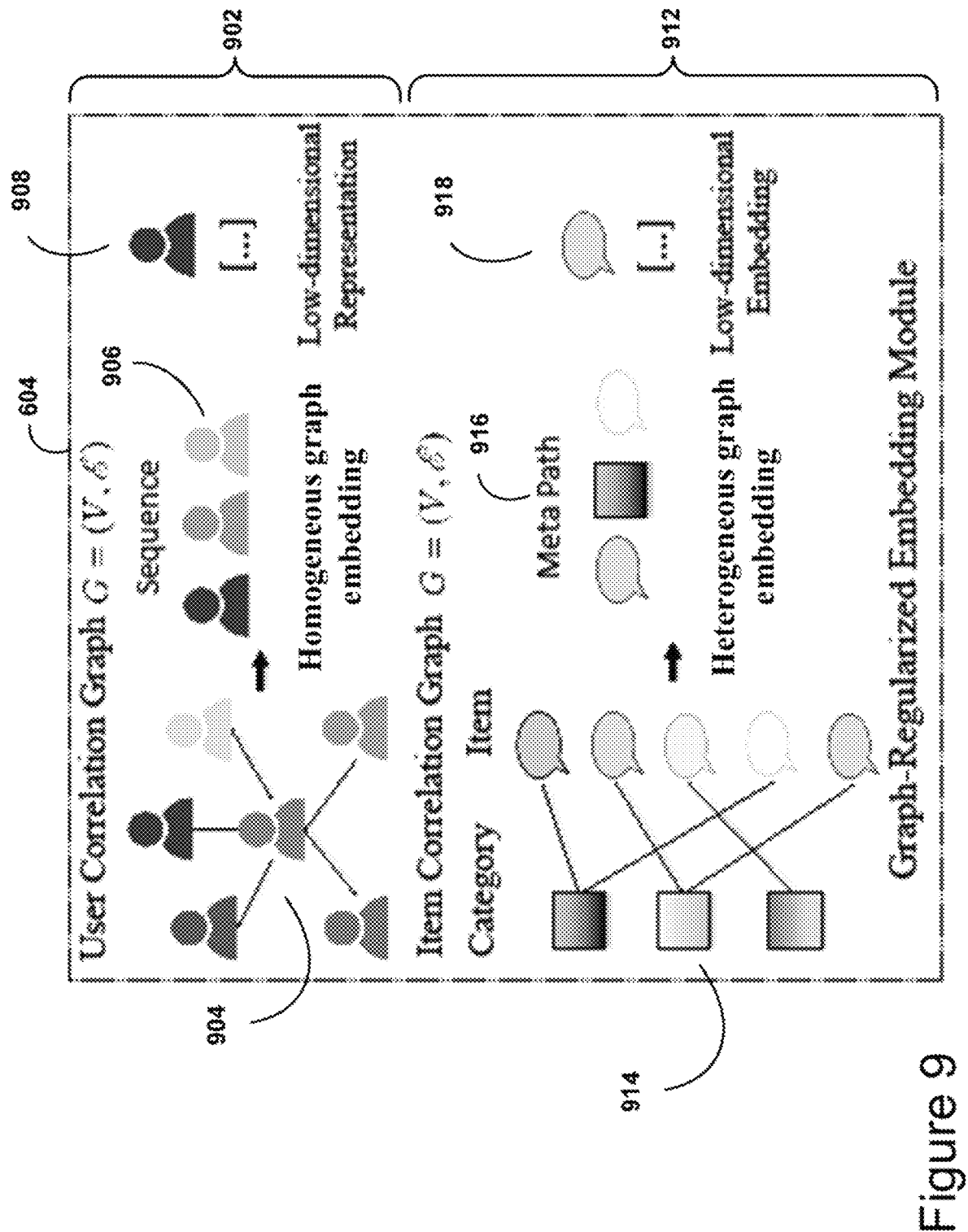

FIG. 9 provides a correlation graph-regularized embedding example in accordance with one or more embodiments of the present disclosure.

In accordance with at least one embodiment, given relations between users or items determined using external knowledge, a correlation graph can be represented as G=(V, ε), in which V and ε represent a set of users or items and their relations, respectively. Correlation graph 904 (shown in portion 902) of FIG. 9 provides an example of a user correlation graph that can be built using social networking data. With respect to correlation graph 904, each node represents an individual user and each edge represents an existing social relationship between two users.

In accordance with one or more embodiments, in building correlation graph 904 for users using external social networking system data, an edge between user nodes i and i' is added when a social connection exists between user nodes i and i'. The user correlation graph can be considered to be homogeneous in that each node in the correlation graph is one type of node—a user node.

Correlation graph 914 (shown in portion 912) of FIG. 9 provides an example of an item-category correlation graph that is built using item-category information. Item-category correlation graph 914 is heterogeneous in nature, as it has a diversity of node types—item nodes and category nodes. Each node in the heterogeneous item-category correlation graph 914 represents either an item or a category, and each link represents a relationship between an item and a category (e.g., an edge between an item node and a category node indicates that the item belongs to the category).

In accordance with one or more disclosed embodiments, a type of network embedding is used with the user correlation graph 904 to determine a multi-dimensional feature vector user representation for a new user (or other user with sparse information). Embodiments of the present disclosure use network embedding (e.g., node2vec, metapatch2vec, etc.) and a random walk approach to effectively treat network structures as the equivalent of sentences. By way of a non-limiting example, the node2vec network embedding can be used to determine the feature vector user representation (low-dimensional embedding 908) using user correlation graph 904. In accordance with one or more embodiments, to learn a feature vector user representation for a user using the user correlation graph 904, node2vec provides a neighborhood sampling strategy to determine one or more sequences 906, each of which can be determined using a sampling strategy (e.g., breath-first sampling (BFS) strategy, a depth-first sampling (DFS) strategy, etc.).

Similarly, a type of network embedding can be used with the item-category correlation graph 914 to determine a multi-dimensional feature vector item representation for a new item (or other item with sparse information). By way of a non-limiting example, the metapath2vec network embedding can be used to determine an item's feature vector item representation (e.g., low-dimensional embedding 918) using item-category correlation graph 914.

In accordance with at least one embodiment, a random walk approach is used (with node2vec and metapath2vec) to effectively treat network structures as the equivalent of sentences. Using the random walk approach of node2vec with the homogeneous user correlation graph 904, one or more node sequences 906 are determined, with each node sequence P={ ..., $v_i$, ... }, being generated such that node $v_i$ is randomly selected (using a node sampling strategy such as BFS or DFS) from the neighbors of its predecessor $v_{i-1}$.

With respect to the heterogeneous item-category correlation graph 914, using a random walk approach with metapath2vec and the heterogeneous item-category correlation graph 914, one or more node sequences are determined, where each node sequence is determined by following a node selection strategy (e.g., item-category-item metapath selection strategy 916). To further illustrate using metapath 918, a random walk can start with a first item selection (e.g., selection of a new item for which the feature vector is being determined), followed by a category selection (in which a category is selected that is connected via an edge to the item selected with the first item selection), followed by a second item selection (in which an item is selected that is connected via an edge to the category selected with the first category selection), etc.

A graph embedding learning process used in accordance with at least one embodiment, can be expressed as:

$$\mathcal{L}_{Graph} = -\Sigma_{P \in S(P)} \begin{pmatrix} \Sigma_{(v^*,v) \in P} \log(\sigma(\theta_v^T \theta_{v^*})) + \\ \Sigma_{v'} \mathbb{E}_{v' \sim Dist(v')} \log(\sigma(-\theta_{v'}^T \theta_{v^*})) \end{pmatrix},$$

Expression (6)

where σ represents Sigmoid activation function, v and v' denote the neighborhood context and non-neighborhood nodes of center node v* on random walk P, and $S$(P) is the path set (e.g., the set, or number, of random walks). A random walk process which considers item (or arm) $a_k^t$ as the starting point can be represented by the function RandomWalk(G, $a_k^t$). Determining feature representations for new users and items using the correlation graph and embeddings provides a much more reasoned representation of the new users and items than other approaches, such as a simple, random initialization approach, which fail to consider social connections between users and category connections between items.

In accordance with at least one embodiment, GRC 300 can be an online recommendation system that recommends items to an online user. In a case of an online recommendation system, an online recommendation can be considered as a personalized ranking task. In accordance with one or more embodiments, the neural contextual bandit framework 606 can learn parameters with a ranking-aware objective, e.g., items with positive feedback are intended to be ranked higher than items with negative feedback. In accordance with one or more embodiments, a ranking-aware objective can be generated by integrating pointwise and listwise loss, which can be beneficial for a personalized ranking task.

In accordance with one or more embodiments, the neural contextual bandit framework 606 can be trained, such that positive user interaction observed in connection with an item results in a higher ranking score being assigned to the item. Otherwise, the ranking score of an item can be set lower than other items. Thus, the neural contextual bandit framework 606 can predict the relative order among user-item interactions, rather than inferring their absolute scores as optimized in pointwise loss. To maximize the likelihood for a ranking score vector, a loss function can be expressed as follows:

$$\mathcal{L}_{Payoff} = -\Sigma_t r_p^t \log\left(\frac{e_p^t}{\Sigma_k e_k^t}\right) + (1-r_p^t) \log\left(1 - \frac{e_p^t}{\Sigma_k e_k^t}\right),$$

Expression (7)

By integrating the loss function of our triple relation in Equation (5), a designed joint objective function can be represented as follows:

$$\mathcal{L}_{joint} = \mathcal{L}_{payoff} + \lambda \mathcal{L}_{Metric} + \mathcal{L}_{Graph},$$

Expression (8)

where λ represents the coefficient that controls the weight of the term for the metric learning. GRC 300 can be learned by minimizing the above loss function between the observed user-item interactions and the estimated reward. A batch size, which represents the number of samples processed before GRC 300 is updated, can be denoted as bsize and Expression (8) can be optimized using the Adam optimizer, which can be used to determine individual learning rates for different parameters.

FIG. 10 provides an exemplary example of a training process 1000 for GRC 300. Each corresponds to a trial, t, in the set of trials, T. In each round (corresponding to trial t), feature vector representations of the target user, $u^t$, and candidate items are used. In a case that the target user is a new user the user correlation graph 904 and graph-regularized embedding can be used (by user and item representation determination module 304) to determine the target user's feature vector representation (e.g. a low-dimension representation/embedding, a multi-dimensional feature vector user representation, etc.). In addition and with respect to each candidate item that is new, item-category correlation graph 914 and graph-regularized embedding can be used (by user and item representation determination module 304) to determine a feature vector representation for the new item (e.g. a low-dimension representation/embedding, a multi-dimensional feature vector item representation, etc.).

Then (at line 10) the neural contextual bandit framework 606 can be used (by reward determination module 308) to determine an expected payoff (or expected reward) for each item (referred to in FIG. 10 as an arm). In accordance with at least one embodiment, the expected payoff can be determined (by reward determination module 308) using Equations (4) and (5) and coefficient, α. At lines 12-13 in the example of FIG. 10, an item having the highest expected payoff (or expected reward) is selected and communicated to the user (by item selection and communication module 310) as an item recommendation for the target user in the current trial. As discussed herein, more than one item can be selected for an item recommendation. The target user's interaction (referred to as the real-valued reward) with the recommended item is observed (by user-item interaction detection module 302).

Information gathered in connection with the current trial can be appended to the set of training data used to update the neural contextual bandit framework 606, as well as the interaction embedding with metric learning 602 and the graph-regularized embedding 604. Such data includes information identifying the target user, the item(s) selected for inclusion in the item recommendation to the user, the target user's feedback (or user-item interaction) with respect to the recommended item(s), the expected payoffs determined for the candidate items in the current trial and a sample set of items having negative user feedback.

In accordance with one or more embodiments, the training can be performed when information about a set of recommendations indicated by the batch size has been accumulated. In accordance with at least one embodiment, a loss can be determined using Expression (8) and the model parameters for the neural contextual bandit framework can be updated using Adam optimization. The process can be repeated for all trials T to learn the hidden parameters of the neural contextual bandit framework 606.

Figure 11:
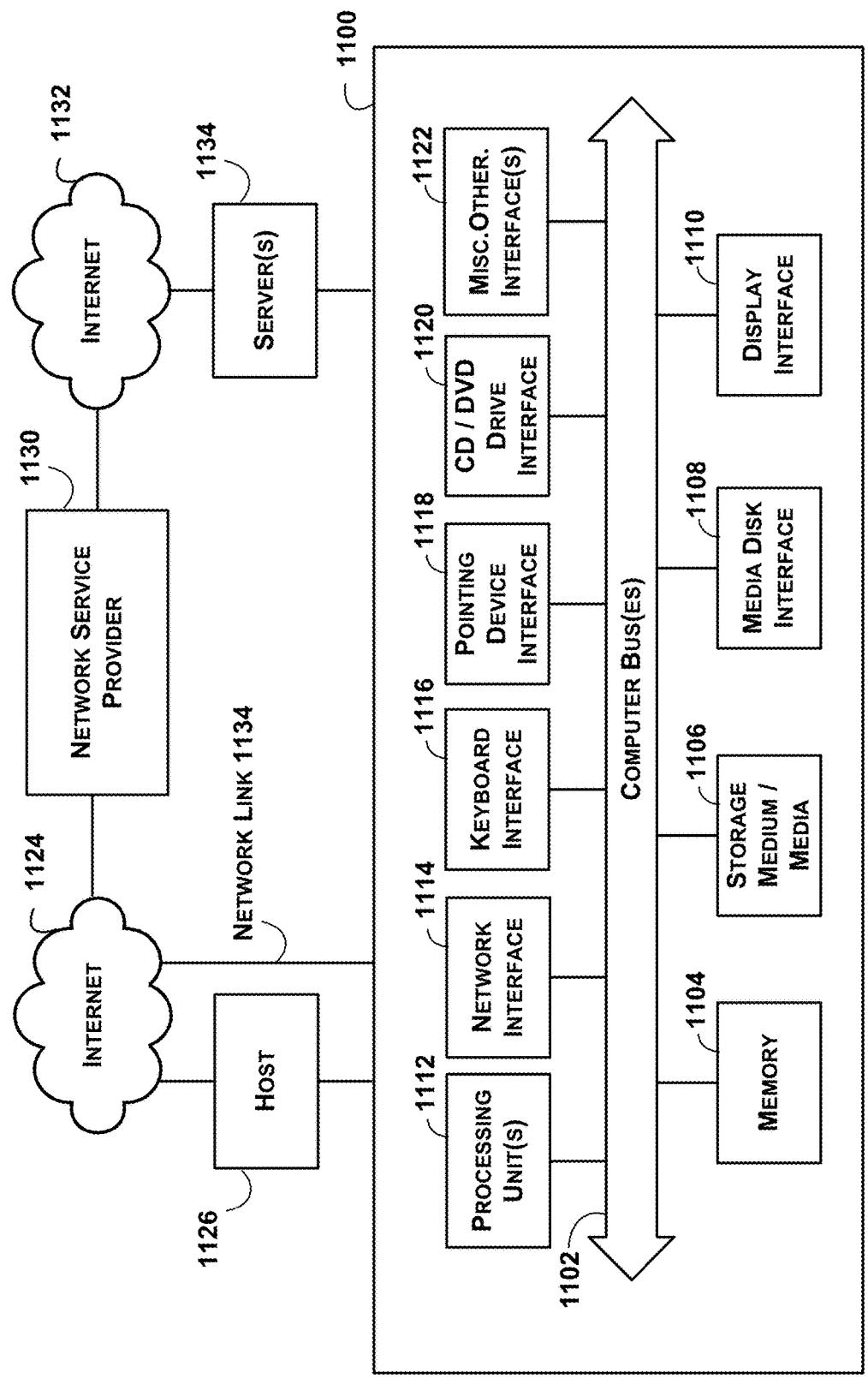
FIG. 11 is a block diagram illustrating the architecture of an exemplary hardware device in accordance with one or more embodiments of the present disclosure.

As shown in FIG. 11, internal architecture 1100 of a computing device(s), computing system, computing platform, user devices, set-top box, smart TV and the like includes one or more processing units, processors, or processing cores, (also referred to herein as CPUs) 1112, which interface with at least one computer bus 1102. Also interfacing with computer bus 1102 are computer-readable medium, or media, 1106, network interface 1114, memory 1104, e.g., random access memory (RAM), run-time transient memory, read only memory (ROM), media disk drive interface 1120 as an interface for a drive that can read and/or write to media including removable media such as floppy, CD-ROM, DVD, media, display interface 1110 as interface for a monitor or other display device, keyboard interface 1116 as interface for a keyboard, pointing device interface 1118 as an interface for a mouse or other pointing device, and miscellaneous other interfaces not shown individually, such as parallel and serial port interfaces and a universal serial bus (USB) interface.

Memory 1104 interfaces with computer bus 1102 so as to provide information stored in memory 1104 to CPU 1112 during execution of software programs such as an operating system, application programs, device drivers, and software modules that comprise program code, and/or computer executable process steps, incorporating functionality described herein, e.g., one or more of process flows described herein. CPU 1112 first loads computer executable process steps from storage, e.g., memory 1104, computer readable storage medium/media 1106, removable media drive, and/or other storage device. CPU 1112 can then execute the stored process steps in order to execute the loaded computer-executable process steps. Stored data, e.g., data stored by a storage device, can be accessed by CPU 1112 during the execution of computer-executable process steps.

Persistent storage, e.g., medium/media 1106, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 1128 typically provides information communication using transmission media through one or more networks to other devices that use or process the information. For example, network link 1128 may provide a connection through local network 1124 to a host computer 1126 or to equipment operated by a Network or Internet Service Provider (ISP) 1130. ISP equipment in turn provides data communication services through the public, worldwide packet-switching communication network of networks now commonly referred to as the Internet 1132.

A computer called a server host 1134 connected to the Internet 1132 hosts a process that provides a service in response to information received over the Internet 1132. For example, server host 1134 hosts a process that provides information representing video data for presentation at display 1110. It is contemplated that the components of system 1100 can be deployed in various configurations within other computer systems, e.g., host and server.

At least some embodiments of the present disclosure are related to the use of computer system 1100 for implementing some or all of the techniques described herein. According to one embodiment, those techniques are performed by computer system 1100 in response to processing unit 1112 executing one or more sequences of one or more processor instructions contained in memory 1104. Such instructions, also called computer instructions, software and program code, may be read into memory 1104 from another computer-readable medium 1106 such as storage device or network link. Execution of the sequences of instructions contained in memory 1104 causes processing unit 1112 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 1100. Computer system 1100 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 1102 as it is received, or may be stored in memory 1104 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

The invention claimed is:

1. A method comprising:
   determining, via a computing device, a group assignment for each item of a plurality of items;
   determining, via the computing device, a multi-dimensional feature vector user representation corresponding to a user using information about the user;
   determining, via the computing device, a plurality of item representations corresponding to the plurality of items, each item representation comprising a multi-dimensional feature vector item representation determined using information about the item;
   determining, via the computing device, a plurality of user-item pairs in a feature space, each user-item pair in the feature space relating the user with one of the items of the plurality of items;
   determining, via the computing device, distances in the feature space for the plurality of user-item pairs by determining a distance between the corresponding feature vector item representation and feature vector user representation using the item's group assignment;
   determining, via the computing device, a plurality of item preferences of the user using the determined distances; and
   automatically selecting, via the computing device, at least one item from the plurality of items for a recommendation using the plurality of item preferences.

2. The method of claim 1, determining a group assignment for each item further comprising, for an item of the plurality of items, using feedback information corresponding to the user and the item.

3. The method of claim 2, determining a group assignment for each item further comprising further comprising:
   using the feedback information corresponding to the user to group the plurality of items into at least three groups, a first group comprising each item previously recommended to the user and having positive feedback of the user, a second group comprising each item previously recommended to the user and having negative feedback of the user, and a third group comprising each unrecommended item without feedback of the user.

4. The method of claim 3, determining the distances further comprising:
   causing the distance of each item in the first and third groups to be less than the distance of each item in the second group.

5. The method of claim 1, further comprising:
using a trained contextual bandit model to determine the user's preference using the feature space relating the user with each item of the plurality of items.

6. The method of claim 5, the trained contextual bandit model comprising a reward deviation with dropout neural network and a multi-layer perceptron to determine a likelihood of positive user feedback from the user in connection with an item of the plurality of items.

7. The method of claim 1, each selected item has an item preference greater than each unselected item of the plurality.

8. The method of claim 1, further comprising:
receiving, at the computing device, a request for an item recommendation in connection with the user; and
communicating, via the computing device, the recommendation to the user for display on a device of the user in response to the request.

9. The method of claim 1, the information about the user comprising feedback of the user regarding at least one previous item recommendation.

10. The method of claim 1, the user is a new user and the multi-dimensional feature vector user representation comprises a low-dimensional user representation determined using graph-regularized embedding.

11. The method of claim 1, an item of the plurality of items is a new item and the new item's multi-dimensional feature vector item representation comprises a low-dimensional item representation determined using graph-regularized embedding.

12. A non-transitory computer-readable storage medium tangibly encoded with computer-executable instructions that when executed by a processor associated with a computing device perform a method comprising:
determining a group assignment for each item of a plurality of items;
determining a multi-dimensional feature vector user representation corresponding to a user using information about the user;
determining a plurality of item representations corresponding to the plurality of items, each item representation comprising a multi-dimensional feature vector item representation determined using information about the item;
determining a plurality of user-item pairs in a feature space, each user-item pair in the feature space relating the user with one of the items of the plurality of items;
determining distances in the feature space for the plurality of user-item pairs by determining a distance between the corresponding feature vector item representation and feature vector user representation using the item's group assignment;
determining a plurality of item preferences of the user using the determined distances; and
automatically selecting at least one item from the plurality of items for a recommendation using the plurality of item preferences.

13. The non-transitory computer-readable storage medium of claim 12, determining a group assignment for each item further comprising, for an item of the plurality of items, using feedback information corresponding to the user and the item.

14. The non-transitory computer-readable storage medium of claim 13, determining a group assignment for each item further comprising further comprising:
using the feedback information corresponding to the user to group the plurality of items into at least three groups, a first group comprising each item previously recommended to the user and having positive feedback of the user, a second group comprising each item previously recommended to the user and having negative feedback of the user, and a third group comprising each unrecommended item without feedback of the user.

15. The non-transitory computer-readable storage medium of claim 14, determining the distances further comprising:
causing the distance of each item in the first and third groups to be less than the distance of each item in the second group.

16. The non-transitory computer-readable storage medium of claim 12, further comprising:
using a trained contextual bandit model to determine the user's preference using the feature space relating the user with each item of the plurality of items, the trained contextual bandit model comprising a reward deviation with dropout neural network and a multi-layer perceptron to determine a likelihood of positive user feedback from the user in connection with an item of the plurality of items.

17. The non-transitory computer-readable storage medium of claim 12, the information about the user comprising feedback of the user regarding at least one previous item recommendation.

18. The non-transitory computer-readable storage medium of claim 12, the user is a new user and the multi-dimensional feature vector user representation comprises a low-dimensional user representation determined using graph-regularized embedding.

19. The non-transitory computer-readable storage medium of claim 12, an item of the plurality of items is a new item and the new item's multi-dimensional feature vector item representation comprises a low-dimensional item representation determined using graph-regularized embedding.

20. A computing device comprising:
a processor;
a non-transitory storage medium for tangibly storing thereon program logic for execution by the processor, the program logic comprising:
determining logic executed by the processor for determining a group assignment for each item of a plurality of items;
determining logic executed by the processor for determining a multi-dimensional feature vector user representation corresponding to a user using information about the user;
determining logic executed by the processor for determining a plurality of item representations corresponding to the plurality of items, each item representation comprising a multi-dimensional feature vector item representation determined using information about the item;
determining logic executed by the processor for determining a plurality of user-item pairs in a feature space, each user-item pair in the feature space relating the user with one of the items of the plurality of items;
determining logic executed by the processor for determining distances in the feature space for the plurality of user-item pairs by determining a distance between the corresponding feature vector item representation and feature vector user representation using the item's group assignment;
determining logic executed by the processor for determining a plurality of item preferences of the user using the determined distances; and selecting logic executed by the processor for automatically selecting at least one item from the plurality of items for a recommendation using the plurality of item preferences.

* * * * *